April 7, 1959  M. SCIALLA  2,880,575
COMBINED VARIABLE AREA NOZZLE AND AERODYNAMIC BRAKE
Filed Nov. 28, 1952  3 Sheets-Sheet 1
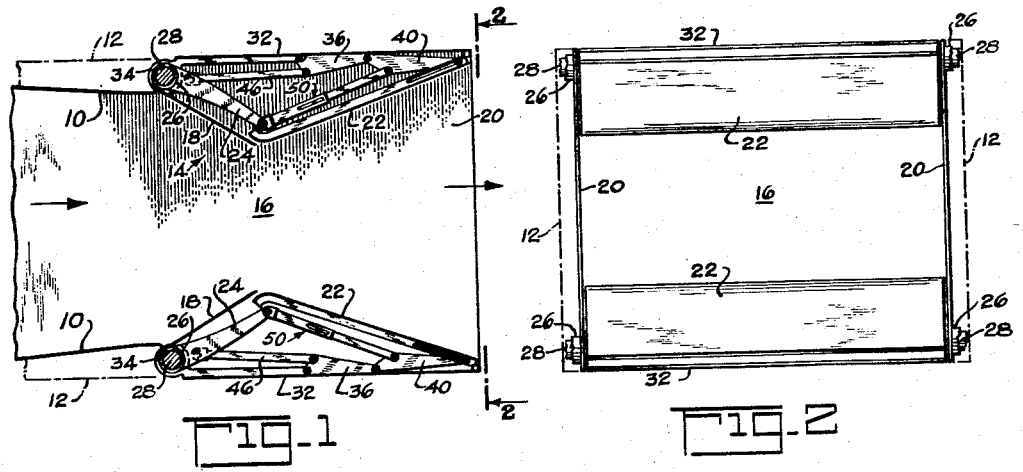
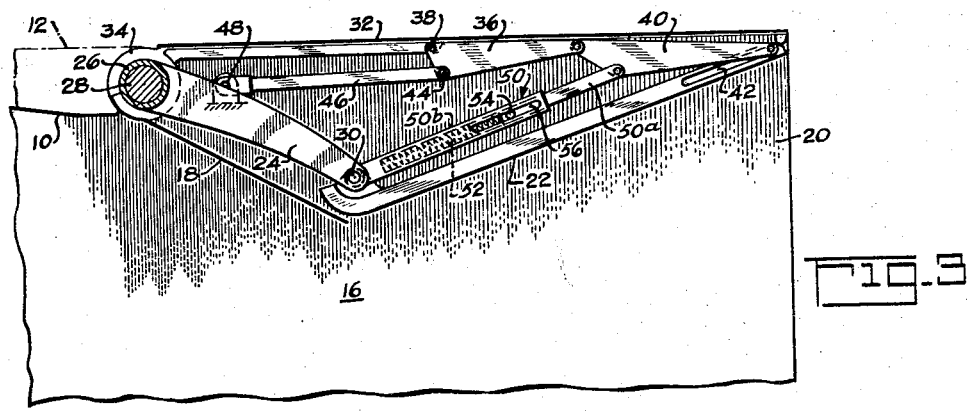
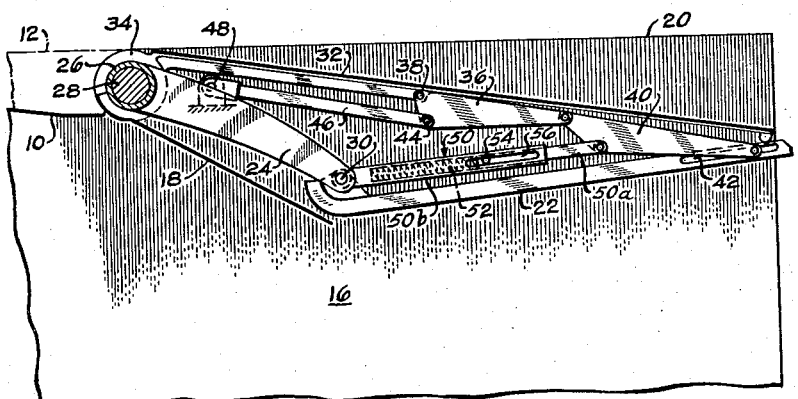
INVENTOR
MICHAEL SCIALLA.
BY Victor D. Behn
ATTORNEY April 7, 1959 M. SCIALLA 2,880,575
COMBINED VARIABLE AREA NOZZLE AND AERODYNAMIC BRAKE
Filed Nov. 28, 1952 3 Sheets-Sheet 2
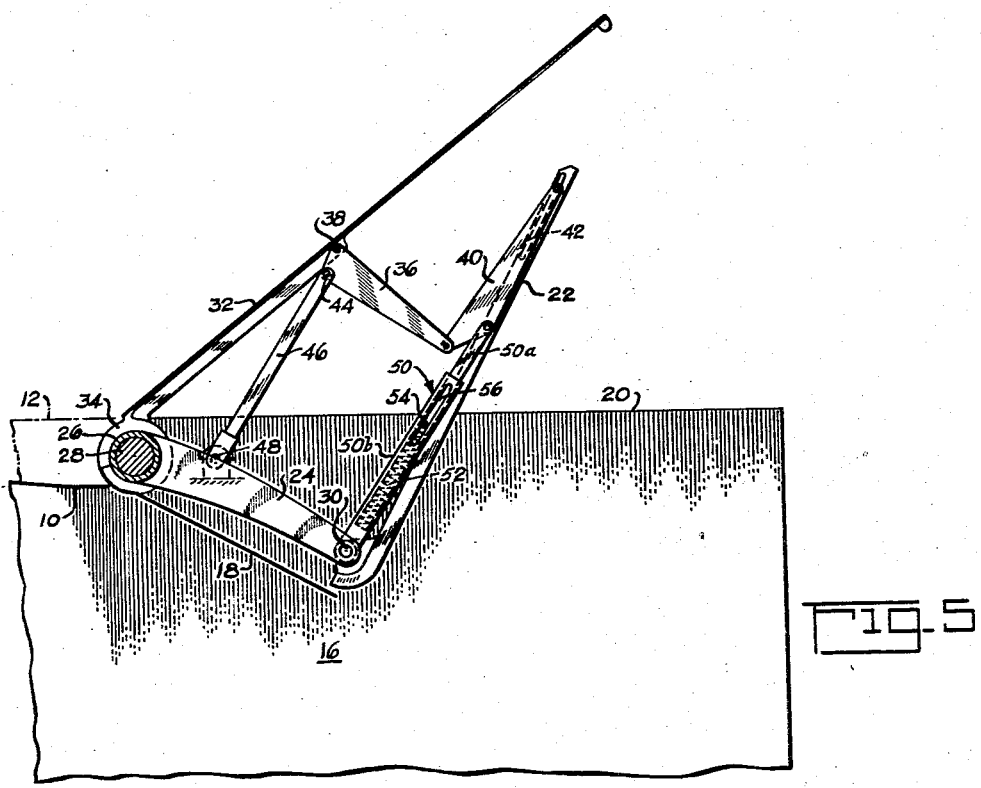
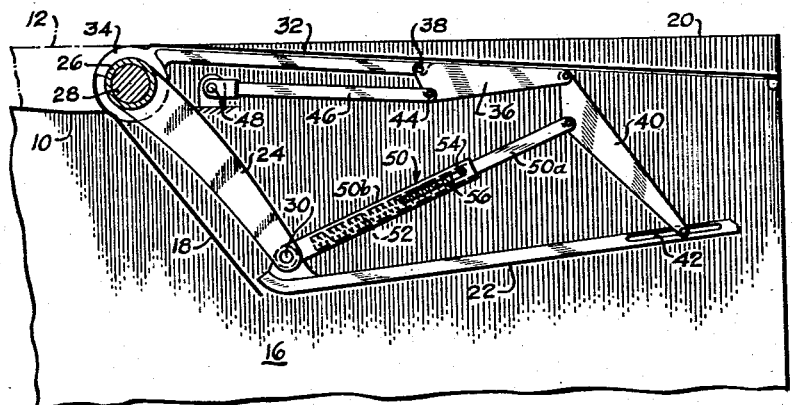
INVENTOR
MICHAEL SCIALLA
ATTORNEY United States Patent Office 2,880,575
Patented Apr. 7, 1959

2,880,575
COMBINED VARIABLE AREA NOZZLE AND AERODYNAMIC BRAKE

Michael Scialla, Paterson, N.J., assignor to Curtiss-Wright Corporation, a corporation of Delaware Application November 28, 1952, Serial No. 322,946

5 Claims. (Cl. 60—35.54)

This invention relates to aircraft jet engines and is particularly directed to the combination with a variable exit area jet engine exhaust nozzle of means capable of functioning either as an aerodynamic brake for the aircraft or as a fairing movable with changes in the nozzle exit area.

For maximum engine thrust the exit area of a jet engine convergent-divergent exhaust nozzle is made variable. With such a nozzle the engine drag force can be minimized or reduced if the housing or fairing means surrounding the nozzle is movable with the diverging nozzle portion at least through a portion of the range of adjustment of the nozzle exit area. An object of the present invention comprises the provision of a combination jet engine exhaust nozzle having a variable exit area with means overlying the movable exit end of said nozzle, said means being movable with the exit end of said nozzle throughout at least a portion of the range of adjustment of the nozzle exit area so as to function as a nozzle fairing, said means also being movable to a position in which it diverges into the surrounding air stream to function as an aerodynamic brake for the aircraft.

Other objects of the invention will become apparent upon reading the annexed detailed description in connection with the drawing in which:

Fig. 1 is an axial sectional view through a combination embodying the invention and comprising an aircraft jet engine exhaust duct and variable area exhaust nozzle with means capable of functioning either as an aerodynamic brake or as a nozzle fairing;

Fig. 2 is an end view of Fig. 1 and taken along line 2—2 of Fig. 1;

Fig. 3 is an enlarged view of a portion of Fig. 1 illustrating the parts in one position of adjustment; and Figs. 4, 5, 6, 7 and 8 are views similar to Fig. 3 but illustrating the parts in different positions of adjustment.

Figure 7:
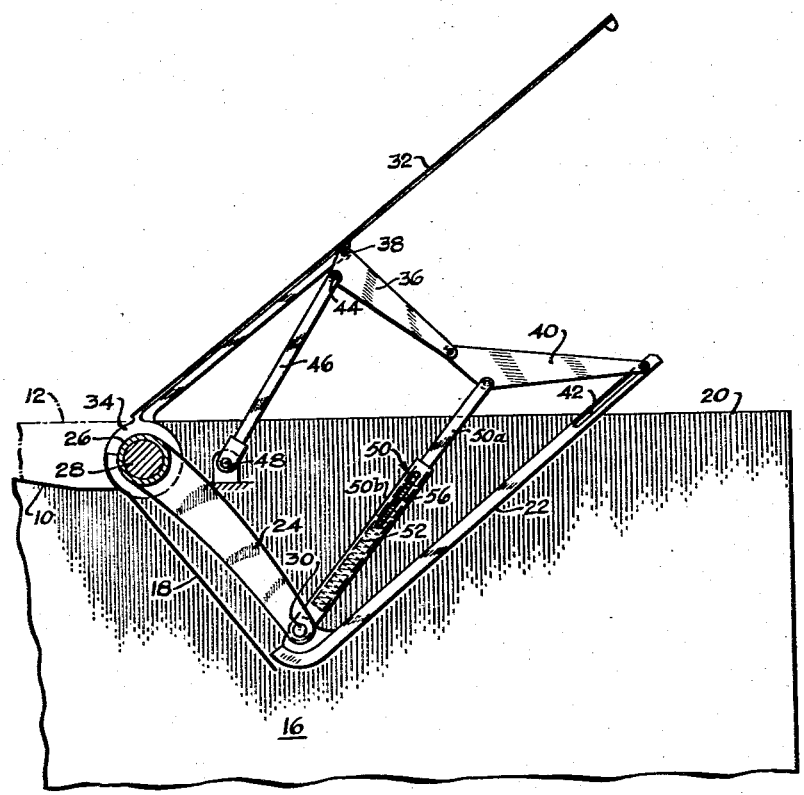

Referring to the drawing, an aircraft jet engine exhaust duct is illustrated in part at 10, said duct being housed within and surrounded by an aircraft body member 12 which, for example, may be the tail end of the aircraft fuselage. The duct 10 terminates in a variable-area convergent-divergent exhaust nozzle 14 through which the aircraft jet engine exhaust gases discharge rearwardly to provide the engine with forward propulsive thrust.

The nozzle 14 has a throat 16 intermediate its ends whereby the upstream portion of the nozzle has a flow passage of converging cross-sectional area and the downstream portion of the nozzle has a flow passage of diverging cross-sectional area. The nozzle 14 is of rectangular cross-section and the upstream portion of the nozzle is formed by a pair of opposed movable nozzle plates 18 extending between a pair of opposed fixed and parallel side walls 20 of the duct 10. The downstream portion of the nozzle is formed by a pair of opposed movable nozzle plates 22 also extending between said side walls 20. Each nozzle plate 18 is secured to an arm 24 having a sleeve 26 at the upstream end of its plate 18, said sleeve being secured to a shaft 28 which in turn is journaled in the housing 12 and extends transversely across the duct 10. The downstream end of each nozzle plate 18 is pivotally connected at 30 by means of its arm 24, to the upstream end of the adjacent nozzle plate 22 to form the nozzle throat 16.

A pair of movable plate-like members 32 form continuations of opposite sides of the housing 12 about the movable nozzle plates 18 and 22. Each plate-like member 32 is arranged to overlie its adjacent pair nozzle plates 18 and 22 and has a tube portion 34 at its upstream end which is journaled about the sleeve 26 of its associated nozzle plate 18. Thus, each plate-like member 32 is supported for pivotal movement about the axis of its associated shaft 28.

The plate-like members 32 are connected to their respective nozzle members 22 for movement of each plate member 32 with and with respect to its associated nozzle member 22. Said connections are identical so that the elements of one connection and the corresponding elements of the other are designated by identical reference numerals. Each said connection between a member 32 and its associated nozzle member 22 comprises a first bell crank type link 36 pivotally connected at one end to a member 32 at a point 38 intermediate the ends of said member, the other end of said link being pivotally connected to one end of a second bell crank link 40. The other end of the said second link 40 is slidingly and pivotally connected to the downstream end of the adjacent nozzle member 22 by means of a pin secured to said link end and received in a slot 42 in said nozzle member 22. The intermediate end of said first bell crank link 36 is pivotally connected at 44 to one end of a link 46 and the other end of the link 46 has a fixed pivot 48 disposed adjacent to the shaft 28. The intermediate end of said second bell crank link 40 is pivotally connected to the hinge connection 30 of its associated nozzle members 18 and 22 by an extensible link 50. Said extensible link 50 includes two portions 50a and 50b telescopically slidable, one within the other and a spring 52 urges said portions to their extended positions. A pin 54 on the portion 50a is received within a slot 56 on the portion 50b to limit the range of relative movement of the telescopic portions 50a and 50b. Said link 46, its fixed pivot 48 and its pivotal connection with the bell crank link 36 are disposed so that upon inward pivotal movement of the member 32, from the position illustrated in Fig. 3, the pivot points 38 and 44 move along substantially parallel arcs so that for a limited amount of inward pivotal movement of the member 32 from its position of Fig. 3 there is only slight pivotal movement of the bell crank link 36 relative to the member 32.

The shafts 28 project beyond the side walls 20 of the duct 10 (as seen in Fig. 2) for connection to common motor means (not shown) for jointly moving the converging nozzle members 18. Rotation of the shafts 28 swings the converging nozzle plates 18 to vary the area of the nozzle throat 16. As also seen in Fig. 2, the tube portions 34 of the members 32 also project beyond side walls 20 of the duct 10 for connection to common motor means (not shown). Through their connections to the diverging nozzle members 22, inward pivotal movement of the members 32 from their positions of Fig. 3 are effective to move the nozzle members 22 to vary the nozzle exit area independently of any adjustment of the nozzle throat. This adjustment of the nozzle exit area independently of the nozzle throat is important for maximum engine thrust, for example, as is more fully explained in copending application Serial No. 311,918, filed September 27, 1952.

With the parts as illustrated in Fig. 3, the external surface of each member 32 forms a parallel continuation of the external surface of the aircraft body member 12. By swinging the members 32 inwardly, for example to the position illustrated in Fig. 4, the diverging nozzle members 22 are swung inwardly a substantially like amount because of the connection between the members 22 and 32. This inward movement of the nozzle members 22 decreases the nozzle exit area and at the same time the members 32 move inwardly with the nozzle members 22. In their position of Fig. 4; the members 32 still closely overlie the movable parts of the nozzle and at the same time provide a substantially smooth and streamline continuation of the external surface of the aircraft body member 12. Thus in their position of Fig. 4, the members 32 function as a nozzle fairing to reduce the aerodynamic drag of the nozzle.

As illustrated in Fig. 5, the members 32 may also be swung outwardly into the surrounding airstream to function as an aerodynamic brake for the aircraft by increasing the drag force of the surrounding atmosphere on the engine housing thereby decreasing the net forward propulsive thrust. When the members 32 are moved outwardly to said aerodynamic brake position, the connection between the members 32 and the diverging nozzle members 22 causes said nozzle members to swing outwardly at an extreme angle. Said adjustment of the diverging nozzle members 22 provides a nozzle exit area which is much too large for maximum engine thrust. This, however, is of no consequence and may even be desirable since the members 32 would only be moved to their position of Fig. 5 when it was desired to brake or slow down the flight speed of the aircraft.

In Fig. 6 the converging nozzle members 18 have been positioned through their shafts 22 to a reduced nozzle throat area position and the diverging nozzle members have been positioned by the combined fairing and brake members 32 and their tube portions 34 for a desired nozzle exit area. As is apparent in Fig. 6, the connection between the members 32 and the diverging nozzle members 22 is such that the members 32 have not moved inwardly to the same extent as said nozzle members. The connection between the combined brake and fairing members 32 and the diverging nozzle members 22 is such that the members 32 do not move inwardly so far that the external airflow over the aircraft body 12 and said members 32 would break away from said members. Obviously if the members 32 were moved inwardly to such an extent that said external air flow would break away from said members then they would no longer function as fairing members providing substantial reduction in nozzle drag. Thus in Fig. 6 the members 32 still function as a fairing for the nozzle. Accordingly, it is apparent from Figs. 3 and 6 that within at least a limited range of adjustment of the converging nozzle members 18 for providing a desired nozzle throat area, the diverging nozzle members 22 can be moved by the combined fairing and brake members 32 to vary the nozzle exit area while said members 32 overlie and function as a fairing for the diverging nozzle members 22. In addition at least within said limited range of adjustment of the nozzle members 18 the members 32 can be moved to their aerodynamic braking positions, as is apparent from Figs. 5 and 7.

Figure 8:
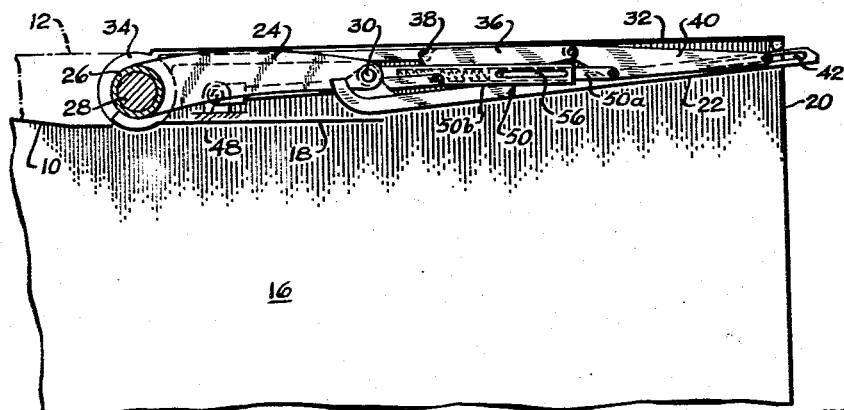

Fig. 8 discloses the nozzle in an extreme position in which the nozzle throat area and the nozzle exit area are a maximum.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination with a jet engine for a vehicle, said engine having an exhaust duct with a rearwardly directed variable area exhaust nozzle at the discharge end of the duct through which the engine exhaust gases discharge to provide forward propulsive thrust through the surrounding atmosphere and said variable area exhaust nozzle including adjustable means having its downstream end movable inwardly and outwardly relative to the duct axis for respectively decreasing and increasing the nozzle exit area; a housing structure for said engine, said housing structure including a combination fairing and brake member overlying said adjustable nozzle means and having its outer surface exposed to flow of said surrounding atmosphere thereover, said member being so shaped and having a first position in which it extends downstream from and in substantially the same direction as the adjacent outer surface of said housing; and linkage means interconnecting said member and adjustable nozzle means for movement of said member with and relative to said nozzle means so that, throughout at least a portion of the range of adjustment of said nozzle means, inward and outward adjustment of the nozzle means is accompanied by movement of the downstream end of said member respectively inward from and outward toward said first position of said member such that throughout its said movement said member outer surface forms a substantially smooth rearward continuation of said housing surface to constitute a movable fairing for said nozzle means, said member also being movable to a position for braking substantially said propulsive thrust.

2. In combination with a jet engine for a vehicle, said engine having an exhaust duct with a rearwardly directed variable area exhaust nozzle at the discharge end of the duct through which the engine exhaust gases discharge to provide forward propulsive thrust through the surrounding atmosphere and said variable area exhaust nozzle including adjustable means having its downstream end movable inwardly and outwardly relative to the duct axis for respectively decreasing and increasing the nozzle exit area; a housing structure for said engine, said housing structure including a combination fairing and brake member overlying said adjustable nozzle means and having its outer surface exposed to flow of said surrounding atmosphere thereover, said member being so shaped and having a first position in which it extends downstream from and in substantially the same direction as the adjacent outer surface of said housing; and linkage means interconnecting said member and adjustable nozzle means for movement of said member with and relative to said nozzle means so that, throughout at least a portion of the range of adjustment of said nozzle means, inward and outward adjustment of the nozzle means is accompanied by lesser movement of the downstream end of said member respectively inward from and outward toward said first position of said member such that throughout its said movement said member outer surface forms a substantially smooth rearward continuation of said housing surface to constitute a movable fairing for said nozzle means; said interconnecting means including means permitting movement of said member, from any of the aforementioned positions of said member in which it functions as a fairing for the nozzle means, to a position in which its downstream end extends outwardly from said first position into the surrounding atmosphere for braking substantially said propulsive thrust.

3. In combination with a jet engine for a vehicle, said engine having an exhaust duct with a rearwardly directed exhaust nozzle at the discharge end of the duct through which the engine exhaust gases discharge to provide forward propulsive thrust through the surrounding atmosphere and said exhaust nozzle having a portion pivotally supported at its upstream end for adjustment of its downstream end inward toward and outward away from the nozzle axis to decrease and increase, respectively, the nozzle exit area; a housing structure for said engine, said housing structure including a combination fairing and brake member pivotally supported at its upstream end so as to overlie said adjustable nozzle portion and having its outer surface exposed to the flow of the surrounding atmosphere thereover, said member being so shaped and having a first position in which it extends downstream from and in substantially the same direction as the adjacent outer surface of said housing; and linkage means interconnecting said member and nozzle portion for movement of said member with and relative to said nozzle portion so that, throughout at least a portion of the range of pivotal adjustment of said nozzle portion, said inward and outward adjustment of said nozzle portion is accompanied by pivotal movement of said member respectively inward from and outward toward said first position of said member such that, throughout its said inward and outward movement, said member outer surface forms a smooth continuation of said housing surface to constitute a movable fairing for said nozzle portion, said interconnecting linkage means being such as to permit movement of said member about its pivot axis to a position in which its downstream end extends outwardly from said first position into the surrounding atmosphere for increasing substantially the drag force of the surrounding atmosphere thereon.

4. In combination with a jet engine for a vehicle, said engine having an exhaust duct with a rearwardly directed convergent-divergent exhaust nozzle at the discharge end of the duct through which the engine exhaust gases discharge to provide forward propulsive thrust through the surrounding atmosphere and said nozzle having an upstream converging portion adjustable to vary the nozzle throat area and a downstream diverging portion movable for adjustment of its downstream end inwardly and outwardly relative to the duct axis for respectively decreasing and increasing the nozzle exit area; a housing structure for said engine, said housing structure including a combination fairing and brake member overlying said diverging nozzle portion and having its outer surface exposed to flow of said surrounding atmosphere thereover, said member being so shaped and having a first position in which it extends downstream from and in substantially the same direction as the adjacent outer surface of said housing; and linkage means interconnecting said member and diverging nozzle portion for movement of said member with and relative to said nozzle portion so that, throughout at least a portion of the range of adjustment of said diverging nozzle portion, inward and outward adjustment of the diverging nozzle portion is accompanied by lesser movement of the downstream end of said member respectively inward from and outward toward said first position of said member such that throughout its said movement said member outer surface forms a substantially smooth rearward continuation of said housing surface to constitute a movable fairing for said nozzle means, said interconnecting linkage means being such as to permit movement of said member to a position in which its downstream end extends outwardly from said first position into the surrounding atmosphere for increasing substantially the drag force of the surrounding atmosphere thereon.

5. In combination with a jet engine for a vehicle, said engine having an exhaust duct with a rearwardly directed convergent-divergent exhaust nozzle at the discharge end of the duct through which the engine exhaust gases discharge to provide forward propulsive thrust through the surrounding atmosphere and said nozzle having an upstream converging portion adjustable to vary the nozzle throat area and a downstream diverging portion pivotally connected to said converging portion at the nozzle throat for adjustment of its downstream end inward toward and outward form the nozzle axis to decrease and increase, respectively, the nozzle exit area; a housing structure for said engine, said housing structure including a combination fairing and brake member pivotally supported at its upstream end so as to overlie said diverging nozzle portion and having its outer surface exposed to the flow of the surrounding atmosphere thereover, said member being so shaped and having a first position in which it extends downstream from and in substantially the same direction as the adjacent outer surface of said housing; and linkage means interconnecting said member and diverging nozzle portion for movement of said member with and relative to said nozzle portion so that, throughout at least a portion of the range of pivotal adjustment of said diverging nozzle portion, said inward and outward pivotal adjustment of the diverging nozzle portion is accompanied by pivotal movement of said member respectively inward from and outward toward said first position of said member such that, throughout its said inward and outward movement, said member outer surface forms a substantially smooth continuation of said housing surface to constitute a movable fairing for said diverging nozzle portion, said interconnecting linkage means being such as to permit movement of said member about its pivot axis to a position in which its downstream end extends outwardly from said first position into the surrounding atmosphere for increasing substantially the drag force of the surrounding atmosphere thereon.

References Cited in the file of this patent

UNITED STATES PATENTS

| | | |
|---|---|---|
| 1,493,280 | Rees | May 6, 1924 |
| 2,420,323 | Meyer et al. | May 13, 1947 |
| 2,546,293 | Berliner | Mar. 27, 1951 |
| 2,569,996 | Kollsman | Oct. 2, 1951 |
| 2,570,629 | Anxionnaz | Oct. 9, 1951 |
| 2,620,622 | Lundberg | Dec. 9, 1952 |
| 2,625,008 | Crook | Jan. 13, 1953 |

FOREIGN PATENTS

| | | |
|---|---|---|
| 580,995 | Great Britain | Sept. 26, 1946 |
| 998,358 | France | Sept. 19, 1951 |